Figure 1:
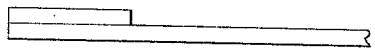

G. H. SELLERS.
Method of Enlarging the Ends of Metal-Bars.

No. 162,422. Patented April 20, 1875.

Fig. 6.     Fig. 4.     —Fig. 5.

Witnesses:     Inventor:
Geo H Sellers.

THE GRAPHIC CO. PHOTO-LITH. 39 & 41 PARK PLACE, N.Y.

UNITED STATES PATENT OFFICE.

GEORGE H. SELLERS, OF WILMINGTON, DELAWARE, ASSIGNOR TO WILLIAM SELLERS AND JOHN SELLERS, JR., OF PHILADELPHIA, PA.

IMPROVEMENT IN METHODS OF ENLARGING THE ENDS OF METAL BARS.

Specification forming part of Letters Patent No. 162,422, dated April 20, 1875; application filed December 7, 1874.

*To all whom it may concern:*

Be it known that I, GEORGE H. SELLERS, of Wilmington, in the county of New Castle and State of Delaware, have invented a new and useful improvement in the art of shaping iron for bridges or analogous structures, of which improvement the following is a specification:

In Letters Patent No. 82,559, issued to me under date September 29, 1868, will be found described the best mode hitherto known to me of swelling up or enlarging the ends of bars intended to be further shaped into links or eye-bars. In that method the enlarged or swelled end of the bar was formed in a suitably-shaped die by upsetting a sufficient length of the bar itself into the die and subjecting it to sufficient pressure to fill the die. As the cross-section of this die is much larger than that of the bar the bar in the die is unsupported, and consequently, if rectangular, is folded sinuously in its weakest direction from side to side of the die by the upsetting pressure, these folds forming pockets across the bar, filled with cinder, which it is impossible afterward to expel by the welding heat and pressure to which it is subjected in the final shaping process, so that the weld is imperfect and the finish impaired.

It is the object of my present invention to prevent sinuous foldings and the formation of cinder-pockets in rectangular bars during the preliminary process of enlarging and upsetting the bar to produce a partially-formed mass upon any portion of the bar where the ultimate shape is required. This ultimate shape is given to the partially-formed mass in suitable dies by a subsequent and final process, forming no part of my present invention.

My invention consists in an improved method of enlarging a part or parts of rectangular bars, so that such enlarged part or parts may be readily shaped; and this I effect by piling that part of the bar which is to be enlarged, placing it, thus piled and at a welding heat, between dies, which, by closing, compress and weld the pile together, and reduce it to the required thickness; then, without opening the dies, subjecting the welded pile in the dies to a second pressure, (at right angles to the closing pressure,) which upsets the metal, and spreads it laterally to the desired width, whereby the welding pressure fills the dies in one direction, and prevents any sinuous foldings or the formation of cinder-pockets during the upsetting process, which spreads the metal laterally to the desired width, conformably with the extent of upsetting movement, without necessarily filling the die in this direction.

Figure 2:
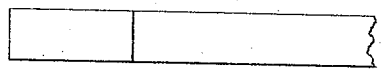
Figure 3:
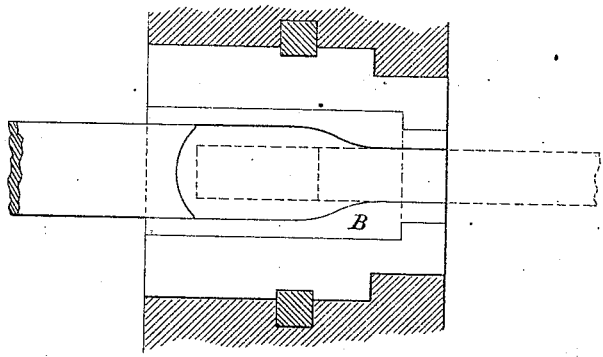
Figure 3:
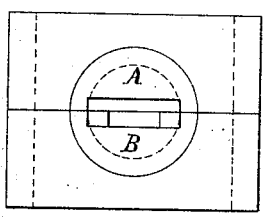
Figure 3:
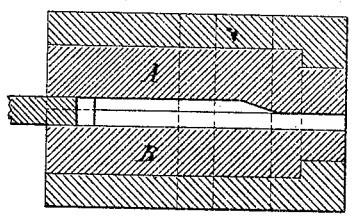
Figure 3:
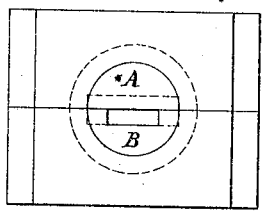

In the accompanying drawings, which make part of this specification, Figure 1 is a side elevation of a rectangular bar and its pile. Fig. 2 is a plan of same. Fig. 3 is a plan of one-half of the welding and upsetting die, and the end of the upsetting bar, the dotted lines in this figure showing the position in the die of the pile to be welded. Fig. 4 is a longitudinal vertical section of the welding and upsetting die, and of the end of the upsetting bar. Fig. 5 is a view of the welding and upsetting die at the entering end for the bar. Fig. 6 is a view of the same at the upsetting end.

The two halves A and B of the welding and upsetting die may be placed in and operated by a screw, lever, or other powerful press, from which they and the upsetting bar may receive the required movements; but, as showing the best means by which I contemplate practicing my improved process, I refer to an application of even date herewith, filed by me for a hydraulic machine for welding, upsetting, and shaping iron, and inasmuch as the construction and operation of such dies are well understood, and their required movements are the same, by whatever means effected, it is unnecessary to give any further detailed description herein.

Having thus described the nature and objects of my invention, what I claim as new, and desire to secure by Letters Patent, is—

The method of piling a rectangular bar, welding the pile between compressing-dies, and, without opening the dies, upsetting the welded metal, substantially as set forth.

In testimony whereof I have hereunto subscribed my name.

GEO. H. SELLERS.

Witnesses:
ANDREW J. BOSWELL,
JAS. H. SCHMACK.